Patented Aug. 20, 1929.

1,725,596

UNITED STATES PATENT OFFICE.

ALFRED PONGRATZ, OF GRAZ, STYRIA, AUSTRIA, ASSIGNOR TO FELICE BENSA, OF GENOA, ITALY.

PROCESS FOR MANUFACTURING DYESTUFFS.

No Drawing. Application filed December 13, 1926, Serial No. 154,654, and in Austria October 2, 1926.

My invention relates to an improved process for manufacturing dye stuffs.

A process is known by which cyanogen may be substituted for the halogens in halogen perylenes by treating the latter with metal cyanides.

If now diacetyl dichloro perylene or diproprionyl dichloroperylene (which may be obtained by the known method of Friedel-Crafts by treating dichloroperylene with acetyl chloride or propionyl chloride in the presence of a solution of anhydrous aluminium chloride in carbon bisulphide), is heated to an elevated temperature with a metal cyanide in the presence of solvents it has been found very surprisingly that the reaction does not cease at the formation of the nitriles, but that condensations take place which lead to the formation of new vat dyes.

Example I.

1 part by weight of diacetyl dichloro perylene is mixed with 1 to 1.2 parts by weight of copper cyanide and heated to boiling with 20 parts by weight of quinoline. Formulas for the starting materials may be expressed as follows:

"diacetyl dichloro perylene

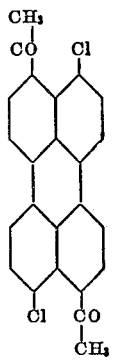

The solution which is at first brown becomes blood red after 10 to 15 minutes and at the same time the dye stuff separates in the form of a dark blue precipitate. The reaction is then finished. The whole may be permitted to stand for several hours after which the dye stuff mixed with copper salts may be recovered by filtration. Alternatively the quinoline may be driven off by the application of steam.

For removing the copper salts, the dye stuff is treated for some time with aqueous ammonia. By forming a vat of the dye stuff and reoxidizing the compound can be obtained in a pure state. It is difficulty soluble in all of the usual solvents. In concentrated sulphuric acid it dissolves with a blue colour. The solution shows a slight red fluorescence. In an aqueous solution of sodium hydoxide and hydrosulphite the dye stuff is dissolved on heating with a red colour and yellowish brown fluorescence. Cotton takes up the solution with fiery red colour which changes on exposure to the air into a reddish violet.

Example II.

1 part by weight of dipropinoyl dichloro perylene and 1 to 1.2 parts by weight of copper cyanide are boiled for 10 to 20 minutes with 20 parts by weight of quinoline. The starting formula, that is to say the formula of dipropionyl dichloro perylene, may be expressed as follows:

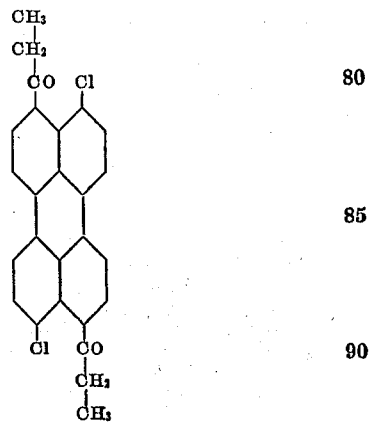

The liquid changes its colour as described in Example I. The dye stuff separates in blackish violet crystalline aggregates. The further treatment takes place as in Example I. The dye stuff is almost insoluble in the usual solvents. In concentrated sulphuric acid it dissolves with a blue colour, the solution shows a slight red fluorescence. With an aqueous solution of sodium hydrosulphite and sodium hydroxide it gives on heating a red vat with a blue tinge and yellowish brown fluorescence. Cotton takes up the solution with a red colour; on exposure to the air the colour changes to reddish violet, but with a more marked blue tinge than the colours of Example I.

Example III.

1 part by weight of diacetyl dichloro perylene and 1 to 1.2 parts by weight of copper cyanide are heated with 20 to 30 parts by weight of pyridine to 190° to 200° centigrade, under pressure for 3 to 4 hours. After the reaction is finished the dye stuff is directly separated by filtration under suction or the entire reaction liquid is treated with aqueous ammonia for removing the copper salts. The product so obtained is identical with the dye stuff of Example I.

Preparing diacetyl dichloroperylene.

1 part by weight of dichloroperylene is finely powdered with 2 parts by weight of anhydrous aluminium chloride. The formula for dischloroperylene, with which the preparation of diacetyl dichloroperylene and dipropionyl dichloro perylene starts, may be expressed as follows:

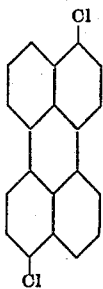

30 parts by weight of bisulphide of carbon are poured over the mixture. Then gradually 0.5 to 0.6 parts by weight of acetyl chloride are added while continuously shaking. The reaction soon commences, the supernatent liquid becoming red. Now the whole is allowed to stand for 20 hours and the reaction is finished after heating for 24 hours in the water bath. The raw product obtained by decomposition with water and distilling off the bisulphide of carbon may be obtained from nitrobenzene or xylol in square plates of a yellowish brown colour.

The compound is soluble in concentrated sulphuric acid with a reddish violet colour. On heating in the fuzing point determining tube the substance decomposes.

Preparing dipropionyl dichloro perylene.

1 part by weight of dichloroperylene is finely powdered with 2 parts by weight of anhydrous aluminium chloride and mixed with 30 parts by weight of bisulphide of carbon. To this under continuous shaking 0.6 to 0.7 parts by weight of propionyl chloride are added gradually. The liquid soon becomes red and the reaction begins, hydrochloric acid being evolved. At room temperature the reaction is finished after 6 hours. The raw product obtained by decomposition with water and distilling off the bisulphide of carbon may be obtained in a crystallized state from nitrobenzene or xylol, the forms of the crystals are similar to those of diacetyl dichloro perylene. In concentrated sulphuric acid the compound dissolves with a reddish violet colour. The substance is not fusible without decomposition.

What I claim is:

1. A process for manufacturing dye stuffs consisting in heating halogen substituents of alkyl perylene diketones having each of the two aliphatic acidyl groups and a halogen atom in adjacent peri position with a metal cyanide in the presence of an organic solvent separating the product of the reaction from the said solvent and removing therefrom the metallic constituent of the said metal cyanide.

2. A process for manufacturing dyestuffs consisting in heating halogen substituents of alkyl perylene diketones having each of the two aliphatic acidyl groups and a halogen atom in adjacent peri position with a metal cyanide in the presence of an organic solvent under pressure, separating the product of the reaction from the said solvent and removing therefrom the metallic constituent of the said metal cyanide.

3. A process for manufacturing dyestuffs consisting in heating halogen substituents of alkylperylene diketones having each of the two aliphatic acidyl groups and a halogen atom in adjacent peri position with a metal cyanide in the presence of pyridine under pressure separating the product of the reaction from the said solvent and removing therefrom the metallic constituent of the said metal cyanide.

4. A process for manufacturing dyestuffs consisting in heating halogen substituents of alkyl perylene diketones having each of the two aliphatic acidyl groups and a halogen atom in adjacent peri position with copper cyanide in the presence of an organic solvent separating the product of reaction from the said solvent and removing therefrom the metallic copper by treatment with aqueous ammonia.

5. A process for manufacturing dyestuffs consisting in heating halogen substituents of alkyl perylene diketones having each of the two aliphatic acidyl groups and a halogen atom in adjacent peri position with a metal cyanide in the presence of an organic solvent, separating the product of the reaction from the said solvent and removing therefrom the metallic constituent of the said metal cyanide and finally dissolving the dyestuff in an aqueous solution of sodium hydrosulphite and sodium hydroxide and re-oxidizing.

6. A process for manufacturing dyestuffs consisting in heating halogen substituents of alkyl perylene diketones having each of the two aliphatic acidyl groups and a halogen atom in adjacent peri position with copper cyanide in the presence of an organic solvent separating the product of reaction from the said solvent and removing therefrom the metallic copper by treatment with aqueous ammonia and finally dissolving the dyestuff in an aqueous solution of sodium hydrosulphite and sodium hydroxide and re-oxidizing.

7. As a new article of manufacture a condensed cyanogen substitution product of alkyl perylene diketones having each of the two aliphatic acidyl groups and a halogen atom in adjacent peri position.

In testimony whereof I affix my signature.

ALFRED PONGRATZ.